(No Model.)
T. SHELTON.
PIPE COUPLING.
No. 324,598. Patented Aug. 18, 1885.
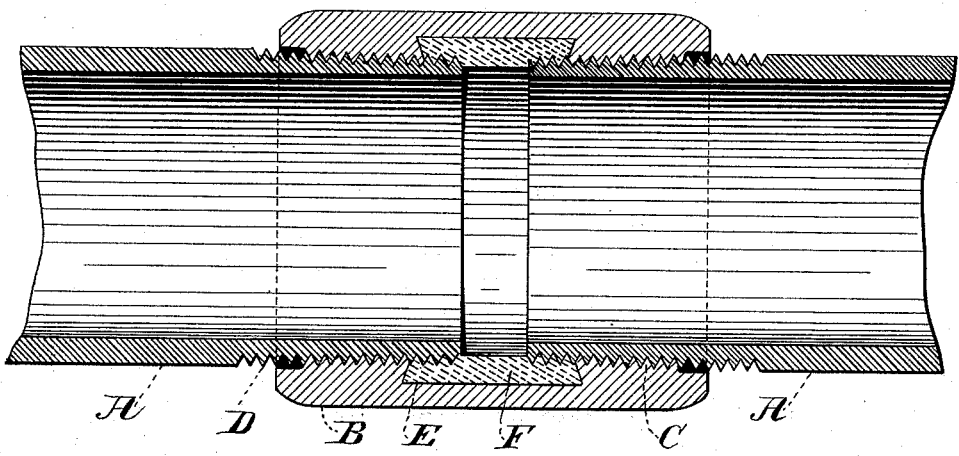
Witnesses:
R. F. Gaylord
Robt. H. Duncan
Inventor:
Thomas Shelton
by Saml. A. Duncan
Atty

UNITED STATES PATENT OFFICE.

THOMAS SHELTON, OF McKEESPORT, PENNSYLVANIA, ASSIGNOR TO JOHN H. FLAGLER, OF NEW YORK, N. Y.

PIPE-COUPLING.

SPECIFICATION forming part of Letters Patent No. 324,598, dated August 18, 1885.

Application filed December 9, 1884. (No model.)

*To all whom it may concern:*

Be it known that I, THOMAS SHELTON, of McKeesport, in the county of Allegheny and State of Pennsylvania, have invented certain new and useful Improvements in Pipe-Couplings, of which the following is a full, clear, and exact description, reference being had to the accompanying drawing.

The invention relates to couplings for connecting the adjoining ends of pipe-sections. It relates, particularly, to couplings used on pipe employed for conveying gases or liquids that are under high pressure, or those that are very subtile and penetrating, it being the object of the invention to produce a coupling that shall not leak under such conditions. Thus it is found that the so-called "natural gases," which usually exist under high pressure and are very subtile, have a penetrating power that the couplings heretofore employed are incapable of wholly resisting. In conveying such gases, therefore, by pipes provided with the common forms of couplings, much danger always exists because of the possibility that the leaking gas may become ignited and explode; and particularly is it desirable to guard against the leaking of such gas because of its insidious and odorless character, and because of its great destructive force when mixed with air and exploded.

The invention consists in an internally-threaded coupling for connecting the adjoining ends of externally-threaded pipe-sections, which coupling is provided with a packing-ring so arranged within it that when the ends of the pipe-sections are inserted into the coupling their threads will cut their way into such ring, and the ring will thereby be compressed around and upon the outer cylindrical surface of their ends.

Referring to the drawing, which is a central longitudinal section of a coupling embodying my invention and portions of two connected pipe-sections, A A are the pipe-sections, and B is the coupling connecting them. This coupling is threaded upon its inner surface, as seen at C, and the pipe-sections are correspondingly threaded upon their outer surface, D, the two sections of pipe being connected by screwing the coupling upon them, as seen in the drawing. The coupling has an annular recess or groove, E, formed in its inner surface, which contains a packing-ring, F, of any suitable material. Ordinarily this ring would consist of some soft metal, lead being preferred. The recess or groove is preferably made dovetail in shape, as shown, to hold the packing-ring securely in place, and the ring is of such thickness that its inner surface extends inwardly about the same distance as do the threads of the coupling. It is preferred to make the threaded portions of the pipe-sections and coupling slightly tapered, as shown, although this particular construction of the coupling and pipe-sections is not essential to the use of the packing-ring.

When the pipe-sections are inserted in the coupling, and their ends reach the packing-ring, the threads upon them will cut their way into the ring, and by displacing the material thereof will cause the ring to be compressed laterally, so as to form a dense and closely-fitting packing between the bottom of the recess and the outer surface of the ends of the pipe-sections.

It will be seen that the arrangement and shape of the packing-ring are such that the whole of its surface is in the path of the screw-threads on the pipe-sections—that is, the ring does not project inwardly beyond the bottom of the screw-threads on the pipe-sections, so as to prevent the pipe-sections being screwed into it until they meet, or so as to prevent a section being screwed through it, and this is for the purpose of making as tight a joint when a section has been unscrewed from the coupling and again inserted as when the section was first inserted. Thus, when a pipe-section is unscrewed it leaves the packing-ring threaded to the extent that it was inserted therein, and when the pipe-section is reinserted it will not be as tightly packed by the ring as when first inserted; but as there is a portion of the packing-ring uncut by the thread on the pipe-section, the section when reinserted may be screwed into the ring a little farther than before, and a tight joint thereby insured. By these means a coupling is produced in which the adjacent surfaces of the separate parts of the joint are brought into most complete contact throughout their common extent. This condition of practically perfect contact of the adjacent surfaces of the joint is essential in a coupling on pipes used to convey gases under very high pressure, and such contact is secured in the coupling I have here shown and described. Furthermore, this arrangement of the packing-ring most advantageously compensates for any irregularity in the shape or structure or direction of the pipe-sections, as, manifestly, when it is compressed about the ends of the pipes it adapts itself to the surfaces against which it is packed.

It will be plain that this arrangement of the packing-ring can be availed of in any joint where two pipes are fastened together, and also that the coupling sleeve or collar may form an integral part of either of the connected pipes. Thus it is readily applicable to bends, elbows, branch connections, and to any joint made by one cylindrical piece inserted within another.

I am aware that it is not new to make a coupling in which a packing-ring is compressed between the coupling and the outer surface of the pipe-section; also, that it is not new to screw the pipe-section into a threaded soft-metal ring arranged to form a part of the inner surface of the coupling, and I do not claim these as my invention; but What I do claim as new is—

1. In combination, the externally-threaded pipe-section A and the internally-threaded pipe-coupling B, provided with a packing-ring, F, extending inwardly so that its entire inner surface is beyond the bottom of the screw-threads of the coupling, but not beyond the top of such screw-threads, whereby the threaded ends of the pipe-sections will cut their way in the inner surface of such ring, as and for the purpose set forth.

2. In combination, the beveled and externally-threaded pipe-section A and the correspondingly internally-threaded pipe-coupling B, provided with a packing-ring, F, extending inwardly so that its entire inner surface is in the path of but not beyond the screw-threads of the pipe-section when it is being inserted in the coupling, whereby the threads of the pipe-section will cut their way in the inner surface of such ring, as and for the purpose set forth.

THOS. SHELTON.

Witnesses:
C. F. LUDINGTON,
E. C. CONVERSE.